Aug. 1, 1961 J. H. LOVELESS 2,994,334
AIR SERVO VALVE

Filed Aug. 13, 1959 2 Sheets-Sheet 1

JOHN H. LOVELESS
INVENTOR.

BY W. O. Quesenberry
Claude Funkhouser
ATTORNEYS

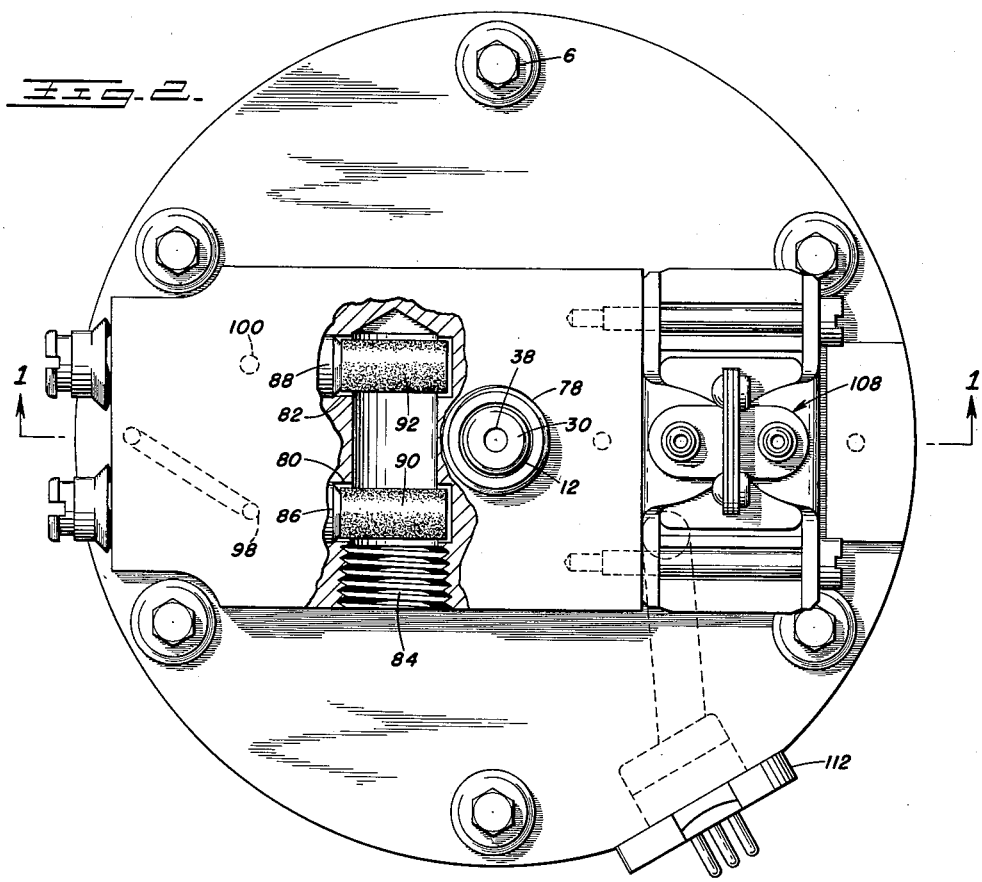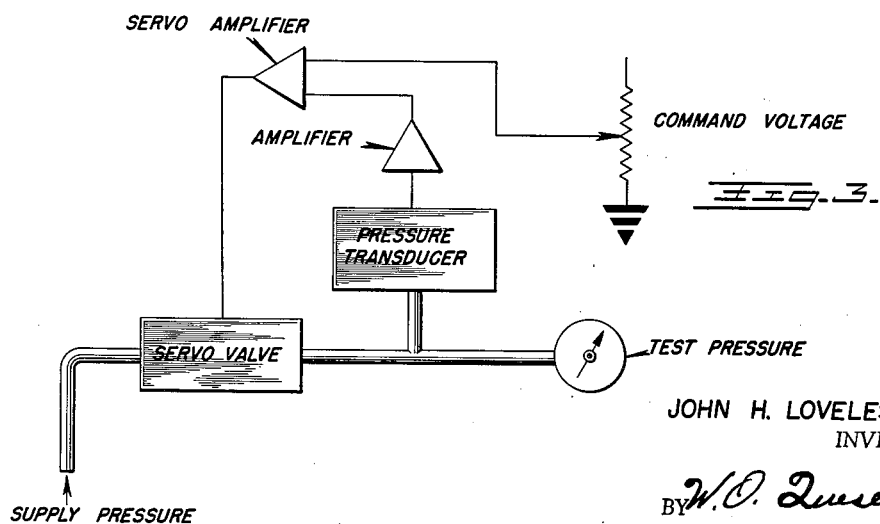

United States Patent Office 2,994,334
Patented Aug. 1, 1961

2,994,334
AIR SERVO VALVE
John H. Loveless, Rockville, Md., assignor to the United States of America as represented by the Secretary of the Navy
Filed Aug. 13, 1959, Ser. No. 833,655
5 Claims. (Cl. 137—102)

This invention relates generally to a flow control valve; more particularly, it relates to an air controlled fluid flow control valve.

It is an object of this invention to provide a flow valve having an air actuated control system capable of precisely regulating fluid flow through said valve.

A further object of the invention is to provide a flow valve so constructed as to provide flow at any one instant into either one or neither of two fluid passageways.

It is also an object of this invention to provide a flow valve so constructed that it is capable of functioning as a pressure regulator.

Other objects and many of the attendant advantages of the invention will be readily appreciated as the same becomes better understood by reference to the following detailed description when considered in connection with the accompanying drawings, wherein:

FIG. 2 is a fragmentary plan view, partly in section, of the flow control valve; and FIG. 3 is a schematic of a pressure regulator circuit employing the flow control valve of the present invention.

Figure 1:
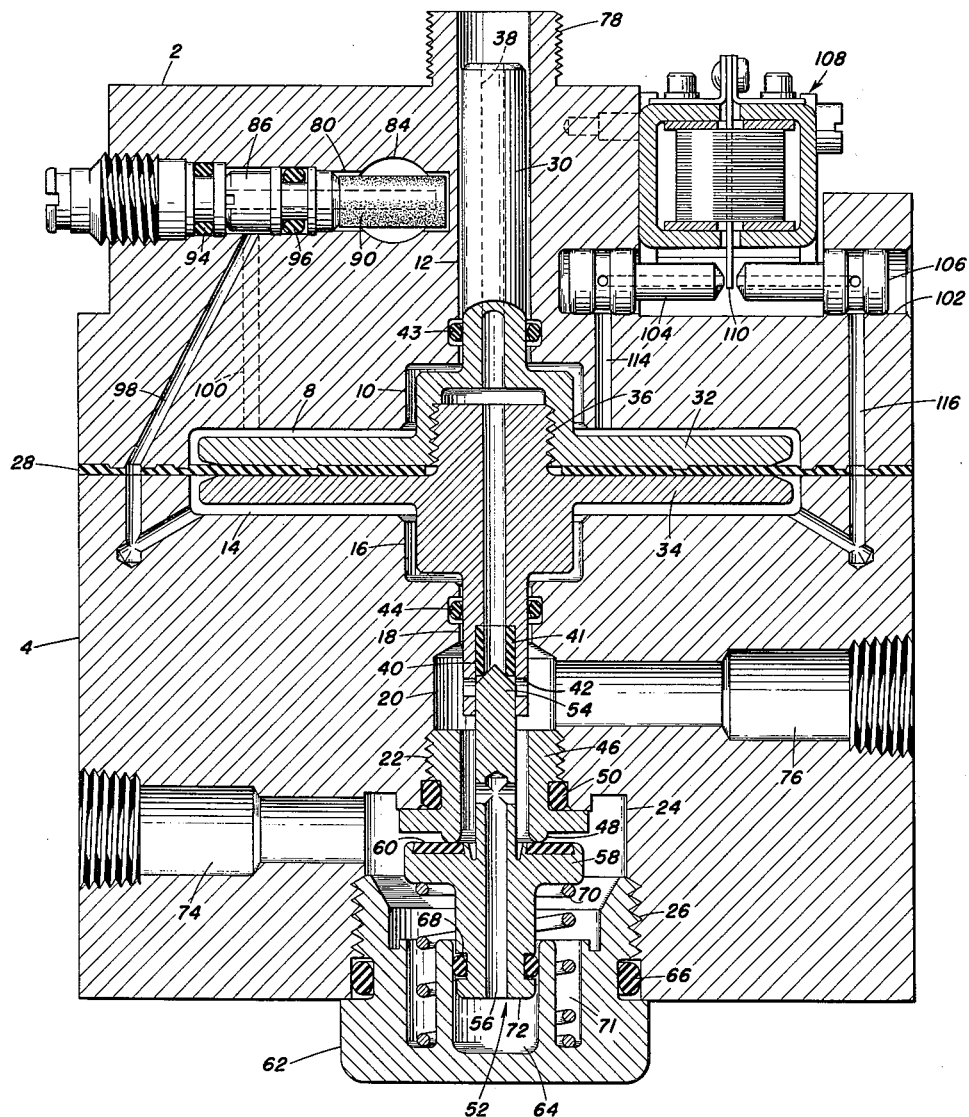
FIG. 1 is a detail section, generally on line 1—1 of FIG. 2, showing the construction of the flow control valve of the present invention.

Air controlled flow valves are well known in the art. Such valves consist of two principal elements; a valve body having the necessary flow control elements therein, and a control system for operating such flow control elements in response to flow requirements. The flow valve of the instant invention contemplates a coaxial arrangement of the control elements within the valve body whereby a valve capable of rapid response to flow requirements is obtained.

As shown in FIG. 1, the flow valve of the present invention is comprised of an upper body portion 2 and a lower body portion 4, said upper and lower body portions being secured to one another by a plurality of screws 6. Disposed within the upper body portion 2 is one portion of a central bore, said portion comprising an annular recess 8, a first cylindrical bore 10, and a second cylindrical bore 12, said recess 8 and said first cylindrical bore 10 being concentrically arranged about the central axis of said second cylindrical bore 12. Disposed within the lower body portion 4 is the second portion of said central bore, said portion comprising an annular recess 14, a first cylindrical bore 16, a second cylindrical bore 18, a third cylindrical bore 20 having a threaded portion 22 therein, and a fourth cylindrical bore 24 having a threaded portion 26 therein. Each of the bores 16, 18, 20 and 24 and the recess 14 of the lower body portion 4 is arranged concentrically about the central axis of the second cylindrical bore 12 of the upper body portion 2.

A diaphragm 28 is clamped in sealed relationship between the opposed mating faces of the upper and lower body portions 2 and 4, the particular configuration of the clamping surfaces being a matter of design. The diaphragm 28 is constructed of any suitable resilient, flexible material, such as rubber.

Disposed within the bores of the combined upper and lower body portions 2 and 4 is an upper valve core 30. Said upper core is composed of an upper flanged portion 32 and a lower flanged portion 34, said portions 32 and 34 being secured to one another by screw threads 36 in such a manner that the diaphragm 28 is securely clamped in sealed relationship therebetween. The upper core 30 has a cylindrical bore 38 therethrough and a counterbore 40 in the lower end thereof, a resilient bushing 41 being disposed within and secured to the walls of said counterbore 40. A plurality of radial openings 42 communicate the cylindrical bore 38 with the exterior of the upper core. A pair of O-ring seals carried in appropriate recesses are disposed at 43 and 44. The combined thickness of the upper and lower flanged portions 32 and 34 in their assembled positions with the diaphragm 28 clamped therebetween is substantially less than the distance between the opposed annular faces of the recesses 8 and 14, whereby said upper core 30 is free to move within the control chamber formed by said recesses 8 and 14 and said bores 10 and 16, a distance sufficient to allow proper functioning of the valve.

Disposed within the threaded portion 22 of the third cylindrical bore 20 is a hollow bushing 46, said bushing 46 having a flanged end thereon upon which is formed a bead 48, said bead forming a circular seat. An O-ring seal 50 insures a fluid-tight joint between said bushing 46 and said third cylindrical bore 20.

A lower core 52 is disposed within said lower body portion 4 and has a conical tip 54 thereon and a central bore 56 therein, said bore extending from the lower end of said lower core to a point midway thereof, at which point radial openings place said bore in communication with the exterior of said core. A circumferentially enlarged flange portion 58 projects from said lower core 52 and carries a resilient seat 60 in a recess in the upper surface thereof. The resilient bushing 41 and the resilient seat 60 may be of any desired material, such as rubber.

Secured within the fourth cylindrical portion 24 by the threads 26 is a threaded plug member 62, having a closed cylindrical recess, or chamber 64 therein. An O-ring 66 insures a fluid-tight joint between said plug member 62 and said lower body portion 4 and an O-ring 68 carried in a groove on the lower core 52 places said core 52 in sealed, telescopic relationship with said chamber 64. A valve spring 70 is disposed within an annular groove 71 in said plug member 62 and acts against the lower side of flange 58 to normally urge the lower core 52 into sealing engagement with the circumferential bead 48. Transverse bores 74 and 76 and boss 78 provide communication between the valve flow control elements and conduits external of the flow control valve, the manner of such communication being fully set forth hereinbelow.

The control system for operating the flow control elements consists of means to apply pressure to the upper and lower sides of the diaphragm 28 together with a means to vary such pressures so as to either maintain the diaphragm 28 in a neutral position or to cause it to move either up or down, such up or down motion serving, as will be hereinafter more fully explained, to open either one of two flow paths through the flow valve.

The upper body portion 2 has two transverse, stepped, threaded bores 80 and 82 therein. A transverse, threaded inlet bore 84 places each of said bores 80 and 82 in communication with the exterior of said upper body portion 2. Each of said bores 80 and 82 has an air filter unit 86 and 88, respectively, disposed therein, the innermost portions of said filter units 86 and 88 having bronze air filters 90 and 92, respectively, thereon, said bronze filters serving to filter the valve controlling air as it is supplied through the inlet bore 84. Each air filter unit 86 and 88 also carries a pair of O-ring seals 94 and 96 thereon. A supply passage 98 conducts valve controlling air from the transverse bore 80 to the underside of the diaphragm 28. A similar supply passage 100 conducts valve controlling air from the transverse bore 82 to the upperside of the diaphragm 28.

The upper body portion 2 also has a transverse nozzle bore 102 therein into which a pair of opposed nozzles 104 and 106 are press fitted. A magnetic motor 108 is mounted by suitable means on the upper body portion 2 in such a manner that the flapper 110 thereof is normally disposed midway of the opposed nozzles 104 and 106, power being supplied to said magnetic motor 108 through a connecting plug 112. An upper control passage 114 conducts valve controlling air from the upperside of diaphragm 28 into the nozzle 104 and a lower control passage 116 conducts valve controlling air from the underside of diaphragm 28 into the nozzle 106.

When the flow control valve of the present invention is employed to control fluid flow from one conduit into either of two other conduits the operation thereof is as follows. The threaded port 76 is connected to a fluid supply conduit. One of two conduits into which fluid is to be conducted is connected to the threaded port 74 and the other such conduit is connected to the threaded port 78. A conduit carrying air under pressure is connected to the threaded inlet 84, thereby pressurizing the control system of the valve. The valve is now ready for operation.

As long as the pressure on the upper and lower side of the diaphragm 28 is equal said diaphragm will remain stationary. This is the condition shown in FIG. 1. In such condition fluid flowing into the flow valve through the port 76 cannot flow through the valve as no through passageways are open. It should be noted that the lower valve core 52 will remain seated against the circular bead 48 under such a condition because the fluid within the valve is free to move through the passageway 56 to a position where a pressure is exerted on the face 72, thereby creating an upward force that is equal to or greater than (depending upon the relative areas employed, this being a matter of design) that fluid-creating force tending to urge the said lower valve core 52 downward.

In order to maintain the diaphragm 28 stationary it is, as previously stated, necessary to establish equal pressure on both sides thereof. Such a condition is acomplished by having the flapper 110 so positioned that an equal amount of valve controlling air is allowed to flow from each of the nozzles 104 and 106. When it is desired to have fluid flow through port 74 the following action is necessary: The magnetic motor 108 is actuated to cause the flapper 110 to move toward the nozzle 104 thereby restricting air flow from said nozzle, while at the same time permitting increased air flow from nozzle 106. Such action creates a pressure differential across the diaphragm 28, the pressure on the upper side thereof being greater than that on the lower side. This condition causes the diaphragm 28 to move downwardly.

As the diaphragm 28 moves downwardly the upper valve core 30 also moves downwardly, such action in turn urging the lower valve core 52 downwardly against the action of the valve spring 70. This creates a flow space between the resilient seat 60 and the circumferential bead 48 whereby fluid is allowed to flow through the valve and out port 74. When it is desired to stop such flow the magnetic motor is again actuated so as to return the diaphragm to its initial position, the lower valve core 52 being thereupon returned to its closed position by the spring 70, thus stopping flow.

When it is desired to cause flow through the flow valve and from the port 78 the following action is necessary: First, the magnetic motor 108 is actuated so as to create a pressure differential upon the diaphragm 28 of such a nature that said diaphragm will move upwardly. Such upward movement of the diaphragm 28 causes the upper valve core 30 to also move upwardly, thereby unseating the resilient bushing 41 from the conical tip 54. Fluid may then flow through openings 42, bore 38, and out of port 78. When it is desired to stop such flow the diaphragm 28 is again returned to its initial position.

As is evident from the above description, the instant flow valve is capable of precisely regulating fluid flow therethrough, the air control system providing for rapid, accurate positioning of the flow control elements.

The flow control valve of the present invention may also be employed as a pressure regulator, such an application being schematically shown in FIG. 3.

When the flow valve is employed as a pressure regulator fluid is supplied thereto through the port 74. The conduit into which fluid is to be conducted is connected to port 76. The port 78 is allowed to remain open so as to provide a vent to the atmosphere. Normally, it is gas flow that is regulated by such a regulator system, but liquid flow may similarly be regulated. In such a case an additional conduit, vented to the atmosphere, may be connected to port 78 to conduct excess liquid away from the vicinity of the device.

As shown in FIG. 3, the pressure transducer measures pressure downstream of the flow valve, the output of said transducer being employed to activate the magnetic motor 108. A command voltage is set to correspond to the desired pressure. Whenever the pressure transducer output provides an error voltage, either positive or negative, the magnetic motor 108 is actuated to correct the condition.

When more pressure is needed downstream the magnetic motor 108 so actuates the diaphragm that the lower valve core 52 is moved downwardly, thereby permitting flow into the conduit connected to port 76. When the pressure downstream becomes greater than that desired, the magnetic motor 108 is actuated to cause the upper valve core 30 to move upwardly, thereby allowing flow from the conduit connected to the port 76 through the bore 38 and out to the atmosphere, such action serving to lower the pressure to the desired level.

A pressure regulator system such as that herein described has been found to provide very accurate and precise regulation in applications where such requirements are a necessity.

As is obvious from the above description, the instant invention is capable of many modifications and numerous applications. This disclosure should therefore be considered as only being illustrative of the invention and the manner in which it may be employed.

What is claimed is:

1. An air controlled flow valve comprising; a valve body having a central bore therein, an elongated upper valve core disposed within said central bore and having a longitudinal bore extending completely therethrough, a lower valve core disposed within said central bore below said upper valve core and having a first portion adapted to engage the lower end of said upper valve core in sealed relationship to thereby close said longitudinal bore therein and a circumferentially enlarged second portion adapted to engage, in sealed relationship, a circumferential seat carried by said valve body within said central bore, said upper valve core having an enlarged portion at the lower end of said longitudinal bore of a size to telescopically receive said first portion of said lower valve core, said enlarged bore portion having a resilient bushing disposed therein, and said circumferentially enlarged second portion of said lower core having a resilient seat disposed upon its upper surface in a position to engage said circumferential seat, plug means detachably secured within the lower end of said central bore below said lower valve core, resilient means disposed between the lower side of said circumferentially enlarged second portion and said plug means for urging said lower core into sealing engagement with said upper core and with said circumferential seat, first port means in said body adjacent to and in communication with the juncture between said circumferentially enlarged second portion and said circumferential seat, second port means in said body adjacent to and in communication with the juncture of said upper and said lower cores, third port means in said body and in communication with the longitudinal bore of said upper core, and air control means to operate said upper and said lower cores including a diaphragm attached to said upper core and to said valve body, said control means functioning to move said upper valve core downwardly, whereby said first and said second port means are placed in communication, and to move said upper valve core upwardly, whereby said second and said third port means are placed in communication.

2. An air controlled flow valve as recited in claim 1, including a recess in said plug means, the lower portion of said lower valve core being in sealed, telescopic relationship with said recess, said lower core having a bore therein extending from its lower end to a point above said circumferentially enlarged second portion and being in communication with the exterior of said lower core at both ends of said bore.

3. An air controlled flow valve as recited in claim 1, wherein said air control means additionally includes means to filter the controlling air and a magnetic motor.

4. An air controlled flow valve comprising, a valve body having a central bore therein, an elongated upper valve core disposed within said centrol bore and having a longitudinal bore extending completely therethrough, the lower portion of said longitudinal bore being enlarged relative to the upper portion thereof, an elongated lower valve core disposed within said central bore below said upper valve core and having a first portion of a size to fit telescopically within said lower, enlarged portion of said longitudinal bore and adapted to engage the lower end of said upper valve core in sealed relationship to thereby close said longitudinal bore therein, said lower core having a circumferentially enlarged second portion longitudinally spaced from said first portion, the upper surface of said circumferentially enlarged second portion being adapted to engage in sealed relationship a circumferential seat carried by said valve body within said central bore, plug means within the lower end of said central bore below said lower valve core, resilient means disposed between the lower surface of said circumferentially enlarged second portion and said plug means for urging said lower core into sealing engagement with said upper core and with said circumferential seat, first port means in said body adjacent to and in communication with the juncture between said circumferentially enlarged second portion and said circumferential seat, second port means in said body adjacent to and in communication with the juncture of said upper and said lower valve cores, third port means in said body and in communication with the longitudinal bore of said upper core, and air control means to operate said upper and said lower cores including a diaphragm attached to said upper core and to said valve body, said control means functioning to move said upper valve core downwardly, whereby said first and said second port means are placed in communication, and to move said upper valve core upwardly, whereby said second and said third port means are placed in communication.

5. An air controlled flow valve as recited in claim 4, including a recess in said plug means, the lower portion of said lower valve core being in sealed, telescopic relationship with said recess, said lower core having a core therein extending from its lower end to a point between said circumferentially enlarged second portion and the upper end of said first portion, said bore being in communication with the exterior of said lower core at both its ends and being constantly in communication at its upper end with said second port means.

References Cited in the file of this patent

UNITED STATES PATENTS

| | | |
|---|---|---|
| 962,516 | Mueller | June 28, 1910 |
| 2,745,429 | Crookston | May 15, 1956 |

FOREIGN PATENTS

| | | |
|---|---|---|
| 508,911 | Italy | Jan. 12, 1955 |